UNITED STATES PATENT OFFICE.

WILLIAM J. MENZIES, OF ST. HELEN'S, COUNTY OF LANCASTER, ENGLAND.

MANUFACTURE OF BURNT ALUM.

SPECIFICATION forming part of Letters Patent No. 308,623, dated December 2, 1884.

Application filed January 14, 1884. (No specimens.)

*To all whom it may concern:*

Be it known that I, WILLIAM JONES MENZIES, of St. Helen's, county of Lancaster, England, have invented a certain new and useful Improvement in the Manufacture of Burnt Alum, of which the following is a specification.

Burnt alum, used as a substitute for cream of tartar in the manufacture of baking-powder, is produced by subjecting ordinary ammonia alum to a heat sufficiently high to drive off to within about one per cent. the whole of the water of crystallization it contains. This article is much more suitable than ordinary alum for the manufacture of baking-powder, as when once mixed with the various ingredients in the baking-powder it does not gather moisture and decompose the bicarbonate of soda it contains, and thus split the package. During the process of heating the ammonia alum, however, a considerable percentage of the sulphate of ammonia, equal to nearly thirty per cent. of the whole quantity originally contained in the alum, passes away with the water of crystallization which is driven off, and is therefore lost.

I have discovered that an article of burnt alum can be obtained in a much more economical manner by evaporating to dryness a concentrated mixed solution of sulphate of alumina and sulphate of ammonia, in the proportion of about four parts of sulphate of alumina to one part of sulphate of ammonia. In practice I take a concentrated solution of sulphate of alumina and mix it with a concentrated solution of sulphate of ammonia, in such proportions that the mixed solution shall contain equal to about twenty-five parts of sulphate of ammonia to each one hundred parts of sulphate of alumina. I then evaporate the mixed solution to dryness, subjecting it to sufficient heat to expel all the water within two per cent. In this manner almost the whole of the ammonia, which is driven off and lost when ordinary ammonia alum is dried down and heated, can by my method of proceeding be economically retained, and yet a similar product be obtained.

I do not claim, broadly, the manufacture of burnt alum, as that has long been known and in use; but

What I claim as my invention, and desire to secure by Letters Patent, is—

1. The preparation of a burnt alum, which consists in mixing together concentrated solutions of sulphate of ammonia and sulphate of alumina, so as to contain a concentrated solution of about twenty-five parts of sulphate of ammonia to each one hundred parts of sulphate of alumina, and then evaporating the mixed solution to dryness, so as to obtain a cream-of-tartar substitute equivalent to that obtained by heating to dryness ordinary crystal ammonia alum.

2. The improved product herein described, consisting of sulphate of ammonia and sulphate of alumina, in the proportions specified.

In witness whereof I have hereunto set my hand.

WILLIAM J. MENZIES.

Witnesses:
O. B. MORRIS,
W. G. BUTTON.